United States Patent
Fearing et al.

(10) Patent No.: US 6,327,124 B1
(45) Date of Patent: Dec. 4, 2001

(54) LOW CURRENT GROUND FAULT RELAY

(75) Inventors: Oliver H. Fearing, Barboursville, WV (US); Geraldo Nojima, Duluth, GA (US)

(73) Assignee: SMC Electrical Products, Inc., Barboursville, WV (US)

( * ) Notice: Subject to any disclaimer, the term of this patent is extended or adjusted under 35 U.S.C. 154(b) by 0 days.

(21) Appl. No.: 09/498,581

(22) Filed: Feb. 4, 2000

Related U.S. Application Data

(60) Provisional application No. 60/118,891, filed on Feb. 5, 1999.

(51) Int. Cl.[7] .................................................. H02H 5/04
(52) U.S. Cl. ............................... 361/31; 361/29; 361/42; 361/47; 361/78
(58) Field of Search ................................. 361/23, 29, 31, 361/42, 47, 78, 79; 318/434, 445, 798, 806

(56) References Cited

U.S. PATENT DOCUMENTS

| | | | |
|---|---|---|---|
| 3,656,136 | * 4/1972 | Blair | 318/490 |
| 4,716,487 | * 12/1987 | Horvath et al. | 361/42 |
| 5,386,183 | 1/1995 | Cronvich et al. | |
| 5,481,194 | * 1/1996 | Schantz et al. | 324/522 |
| 5,675,465 | * 10/1997 | Tanaka et al. | 361/42 |
| 5,715,125 | 2/1998 | Neiger et al. | |
| 5,751,132 | * 5/1998 | Horvath et al. | 318/798 |
| 5,847,908 | * 12/1998 | Herbstritt | 361/31 |
| 5,945,802 | * 8/1999 | Konrad et al. | 318/807 |

* cited by examiner

Primary Examiner—Michael J. Sherry
(74) Attorney, Agent, or Firm—Hinkle & Associates, PC

(57) ABSTRACT

A ground fault relay, especially useful to detect motor leakage currents due to insulation failure. The invention operates in two (2) modes. The first mode is a "look-ahead" mode where possible motor circuit insulation failure is detected prior to the electrical motor being turned on, and the second mode is "real time" mode which detects leakage currents after the motor is turned on and during running of the motor. Processing circuitry is disclosed which enables a user to set predetermined values of leakage current to be detected and to trip the relay after comparison of the leakage current and the predetermined value, if the former is larger than the latter. This invention is able to accurately detect extremely small values of ground leakage current without experiencing nuisance tripping due to extraneous noise.

11 Claims, 1 Drawing Sheet

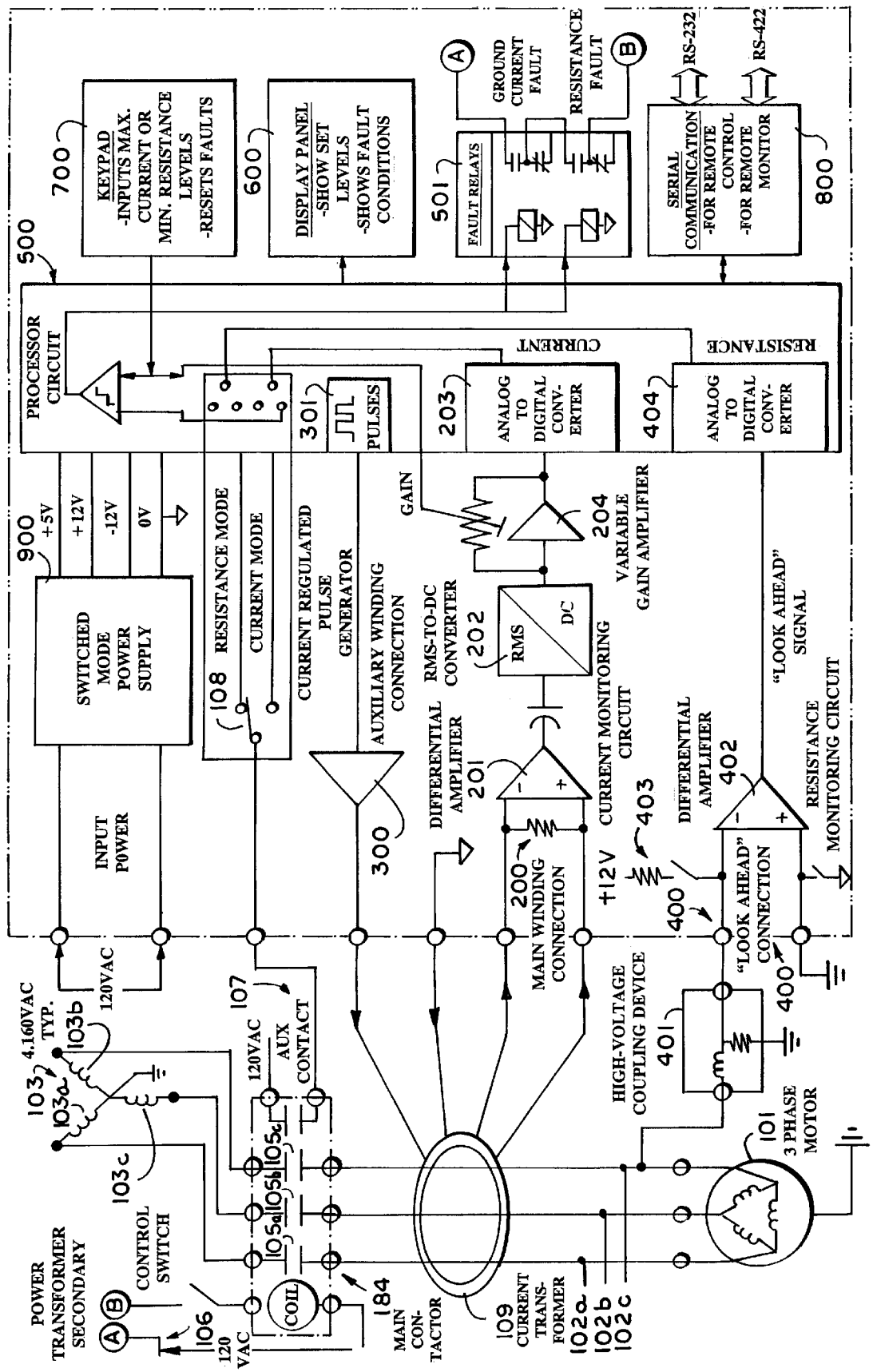

LOW CURRENT GROUND FAULT RELAY

This application claims the benefit of U.S. Provisional application No. 60/118,891 with the filing date of Feb. 5, 1999.

BACKGROUND OF THE INVENTION

I. Field of the Invention

The present invention relates generally to the field of ground fault relays (GFRs) and, more particularly, to GFR devices in which a sensitive relay detects insulation degradation in large electric motors and cables supplying large electric motors. In current practice, the GFR typically reads the current leakage to ground when the motor is turned on and during running of the motor. If the leaking current is above some preset value, the GFR senses this situation and its output, which is normally connected to the motor controller, then causes the motor to be switched off. The present invention operates in two (2) modes. The first mode is a "look ahead" mode prior to the motor being turned on, and the second mode is a "real time" mode after the motor is turned on. In both modes, the GFR evaluates the insulation resistance to ground.

II. Description of the Related Art

Motor control circuits for protecting an electric motor against ground faults are well known in the prior art, when used in both single phase motors and in three phase motors. Typically, three phase motors draw large currents when running and this is especially true in mining operations. However, to be effective, a GFR, in such an environment as a mining, must sense very small amounts of leakage current.

For instance, in U.S. Pat. No. 5,386,183 issued to Cronvich et al., a ground fault relay apparatus for sensing a ground fault in a motor control system is shown wherein the system generates an unrectified signal indicating the current level in two (2) or more conductors of a motor, and then generates from the first and second unrectified signals an unrectified sum signal indicative of the sum of the current levels and then has means for comparing the rectified sum signal to a designated limit to compare that signal with a preset signal to turn off a motor in which the ground fault currents are excessively large.

In U.S. Pat. No. 5,715,125 issued to Neiger et al., an intelligent ground fault circuit relay is shown wherein the relay automatically tests its internal circuitry on a periodic basis to provide a high probability of proper operation in the event of a ground fault in the motor circuit. In addition, this invention discloses a method of monitoring the ground leakage current and to adjust the trip threshold of the GFR to prevent nuisance tripping. Further, this particular patent discloses systems for monitoring the wiring system for detecting a miswired condition and to set various alarms to indicate the various monitored results to a user.

SUMMARY OF THE INVENTION

In accordance with the present invention and the contemplated problems which have existed and continue to exist in this field, the present invention provides a GFR for protecting large electrical motors which draw very large currents when running, but, to be effective, the GFR must sense very small leakage currents in order to protect the motors and operating personnel. The electronic circuitry and hardware of the present invention will provide the sensing operation for effecting desired results. The present invention operates in two (2) modes identified as the "look ahead" mode and the "real time" mode. The "look ahead" mode utilizes a high-voltage coupling device to connect the GFR to the circuit being protected which usually consists of an electrical power cable and an electrical motor. In this mode the GFR is determining the resistance value of the leakage path to ground before the motor is turned on. The "real time" mode utilizes a current transformer to sense the leakage current to ground in the same circuit as previously described. In this mode the GFR is determining the leakage current to ground after the motor is turned on. This invention uses a method of monitoring the ground leakage current which synchronizes the GFR's operation during the motor start-up and shutdown process so as to prevent nuisance tripping when operating in both the current and resistance modes.

In the "look ahead" mode a signal is supplied by the GFR to the motor circuit before the motor is turned on. In the "look ahead" mode the GFR is measuring the resistance that exists between the motor circuit and ground. The relay then compares the measured resistance value with the trip value previously set in the GFR. The GFR only allows the motor to be turned on if the measured value of resistance to ground is greater than the trip value previously set in the GFR. Obviously, the motor is not allowed to turn on if the measured resistance value is less than the preset trip value.

In the "real time" mode, the motor is turned on and the current transformer is measuring the leakage current which may exist between the motor circuit and ground. The GFR compares the leakage current value with a current trip value. If the measured current value is less than the trip preset current value the motor circuit remains turned on. If the measured current value is greater than the preset current trip value the motor circuit is turned off. In addition, before the motor circuit is turned off, the time duration of the measured current value must exceed a time delay preset in the GFR.

In the "real time" mode the current transformer secondary winding is providing a signal to the GFR. Within the GFR the signal is passed through a noise filter to eliminate the extraneous signals which are not desired, thereby improving the electrical noise immunity which results in greater leakage current and line-to-ground resistance measuring accuracy, and less nuisance tripping at lower leakage current or higher resistance value threshold settings. Then the signal is fed to a converter which changes this AC signal to a DC RMS signal and feeds that signal to a programmable gain amplifier. The amplifier is programmable in order to set various signal gain levels for the signal received for the current transformer. This increases the accuracy of measurement when the range is wide, even by several orders of magnitude. The filtered DC RMS converted and now amplified signal is then fed from the amplifier to an analog to digital converter. The digitized value is then fed to a processor circuit which will digitally compare the received signal to the set value in the processor circuit. If the measured value originating from the current transformer in the motor circuit exceeds the selected preset trip value for a time period greater than the preset time delay, then the relay's processor calls for the GFR relay contacts to cause the deactivation of the main contactor which in turn de-energizes the motor circuit.

Other objects, advantages and capabilities of the invention will become apparent from the following description taken in conjunction with the accompanying drawings showing the preferred embodiment of the invention.

BRIEF DESCRIPTION OF THE DRAWINGS

The sole FIGURE is a block diagram of a preferred embodiment of the present invention.

DESCRIPTION OF THE PREFERRED EMBODIMENT

For a fuller understanding of the nature and desired objects of this invention, reference should be made to the following detailed description taken in connection with the accompanying drawing. Motor 101 is a three phase motor which is supplied by electric current through three phase leads 102a, 102b and 102c. The current for motor 101 will typically be supplied by the secondary windings 103a, 103b and 103c of a power transformer 103. For on and off control, power is supplied from the transformer secondary windings 103 through a main contactor 104, which generally shows contactor contacts 105a, 105b and 105c in the respective legs of the three phase wiring leads. In order to operate the contactor contacts 105, a control switch 106 is provided which will be energized at suitable times by 120 volt A.C. current.

An integral portion of the main contactor 104 is an auxiliary contact 107, which, when selectively closed, changes the leakage measuring system from a "look ahead" resistance mode to a "real time" current mode. When auxiliary contact 107 closes, it in turn causes mode switch 108 to change the GFR from resistance mode to current mode. One aspect of the present invention is that before motor 101 is turned on and switch 108 is in the resistance mode, the circuitry of the invention looks ahead for low motor winding to ground resistance which would indicate a low resistance fault to ground. Once the main contactor 104 closes and its integral auxiliary contact 107 closes to change mode switch 108 to the current mode, the invention measures motor circuit leakage current to ground while the motor is operating.

To measure the various currents within leads 102a, 102b and 102c, a suitable current transformer (CT) 109 is provided in the normal manner where all three electric power leads to the motor serve as the CT's primary winding. The analog circuit portion of the present invention may be generally defined as having a current transformer secondary main winding circuit 200, a current transformer auxiliary secondary winding circuit 300 and a "look-ahead" circuit 400. The processing circuit for the invention comprises several interrelated portions, namely, the processor circuit 500, the display circuit 600, the control keypad 700, the serial communication circuit 800 and switched mode power supply 900.

Initially, before the motor 101 is turned on, mode switch 108 is in the resistance mode and main contactor contacts 105a, 105b and 105c are in the open condition. At this point, the "look-ahead" circuit 400 is measuring the resistance between the motorwinding circuit and ground before the motor is turned on. In the system shown in the FIG. 1, the "look-ahead" circuit is measuring leg 102c inasmuch as this is all that is necessary, because, in effect, by measuring one of the legs it effectively measures all three legs. If any of the three legs, when energized, would have a leakage current to ground, and if the leakage current is more than a preset amount, then the relay will trip preventing the main contactor 104 from closing to energize motor 101. The preset trip values would be keyed into processor circuit 500 by the operator. The leakage current to ground is determined by measuring the resistance of the leakage path between the motor circuit and ground before the main contactor 104 is closed, since the leakage circuit is a direct function of the resistance of the leakage path. The "look-ahead" circuit 400 measures the motor circuit line-to-ground resistance and compares the found value to a user's set value, which has been set by the user typically using the keypad 700. If the measured resistance value is below the set resistance value, the processing circuit trips the relay out indicating that the motor circuit insulation to ground has been deteriorated. To measure the line-to-ground resistance without switching on the line voltage from the relay's input terminals, the system of the invention connects to the line voltage via a high inductance, high voltage coupling device 401. The inductance of this coupling device produces a high impedance at 50 Hz or 60 Hz, and thus isolates the line voltage from the analog circuit of the relay. The inductor has a minimum inductance of 18,000 Henry which represents an impedance of $6.8 \times 10^6$ ohm at 60 Hz, thereby allowing a current of only 0.67 milliamperes at 4,160 volts, plus 10%, to flow into the analog input, yet its D.C. resistance is below 20,000 ohms, which is off-set by the processor circuit.

The input circuit of the "look-ahead" circuit consists of a differential amplifier 402 that measures the voltage drop across the motor circuit line-to-ground resistance. When the main contactor 104 is open, the "look-ahead" circuit injects a small electric current between the motor line-to-ground circuit, to produce a voltage drop between line and ground. This voltage drop, as measured by the differential amplifier, is fed to the analog to digital converter 404. The current injection to the motor line-to-ground circuit is done via the dry contacts, indicated as A and B, of a relay that is switched on when the processing circuit detects the main contactor is turned off (resistance mode). If the motor was previously running, the main processing circuit waits and turns the voltage divider relay on to begin to measure resistance after the motor is de-energized. The process circuit is so designed that it knows that the motor is demagnetized by calculating the electric time constant of the motor and waiting for a minimum of five (5) time constants, before the resistance measurement begins. When the circuit is shut off, the motor, still turning for a period of time, generates some voltage while it is still magnetized. Because of the possibility of these generated voltages being present in the motor, the processing circuit waits a minimum of five (5) electric time constants before the resistance measurement begins. Otherwise, the generated voltage might destroy the "look-ahead" circuit. When the "look-ahead" circuit 400 is not used, the 12 volt supply circuit 403 used for the current injection is opened to isolate the relay circuit from the motor circuit ground. This isolation technique has the advantage of increasing the electrical noise immunity due to the isolation of the system ground from the common connection of the processor circuit while the motor is energized.

Turning now to the main winding circuit of the CT, it can be seen that the main winding of the circuit 200 is connected to differential amplifier 201 whose output is D.C. current de-coupled via capacitor 800 and inputted to the RMS-to-DC converter 202. The purpose of the RMS-to-DC converter is to keep track of the RMS value of the A.C. current translated by the CT via a D.C. voltage output that is digitized by a high speed analog to digital converter 203 in the processing circuit.

Prior to being digitized, the RMS converted to DC signal passes through an automatic variable gain amplifier 204 whose gain is set by the microprocessor depending upon the selected threshold value. The gains are calculated to provide consistent resolution and accuracy when the minimum and maximum set values are one or more orders of magnitude apart. The digitized value then passes through a low pass filter in the processing circuit and then is compared to a selectable threshold set value. If the measured value is above the set value, then the microprocessor will trip the relay out.

In the auxiliary winding circuit 300 of the CT, the circuit generates a pulsating regulated current that is injected into the auxiliary winding to produce a periodical test signal that is detected as described above with respect to the main winding circuit. The exception is that when the test signal is detected, instead of the relay tripping out, the processing circuit acknowledges that the current transformer and its connections are good and continues to monitor the motor's ground current. In case the signal is not detected, the processing circuit activates an error condition indicating that the current transformer and/or its connections are defective, thereby tripping the relay.

Processing circuit 500 consists of a microprocessor and its associated circuits and software. The processing circuit will cover several functions. First of all, it digitizes the analog measured values for resistance and current which are fed to it. It then performs filtering functions on both resistance and current signals, and resolves the current or resistance thresholds by comparing the measured values and the set values thereby tripping the relay out if the set values are exceeded. The processing circuit performs the selected time delay function in the case of the ground current monitoring mode. Further, the processing circuit monitors the main contactor 104 status of motor 101 and switches to the "look-ahead" resistance monitor mode when the contactor is turned off, or to the current mode when the contactor 104 is turned on.

When the contactor 104 goes from the on condition to the off condition, the processor circuit delays the resistance measurement function for a minimum of five (5) motor electrical time constants to allow the motor to demagnetize before measuring its insulation resistance as described above. In addition, the processor circuit enables the regulated current pulse generator 301 to test the current transformer and its connections. This is done every few seconds and the ground current monitoring of motor 101 is disabled to perform a current transformer and GFR relay test which takes a fraction of one second. The processor circuit will drive the display circuit 600 to indicate to the user the mode of operation, the programmed settings and the fault conditions. In addition, the processor circuit will drive the dry contact relays 501 for resistance and current faults. The information from the user interface keypad 700 is read by the processor circuit to perform threshold programming, that is, to select the set values, to test and reset commands and to monitor programming functions. Data and commands are exchanged between the processing circuit and a remote monitor display unit (not shown) through a serial communication device 800.

The display panel 600 is especially designed to indicate to the user the two (2) monitoring modes of the invention, the set values for current, delay time and resistance thresholds, any particular fault condition detected by the relay, and help the user to select the threshold values during the programming of the relay.

The keypad 700 allows the user to convey commands to the relay's processor circuit to test the current mode circuits and the current transformer connected to it, and to program the threshold values for resistance, current and delay time. It is also used to reset any fault conditions detected by the relay.

The serial communication circuit 800, as mentioned above, is used to connect the relay to remote monitoring units and/or to remote host computers through standardized serial data communication cables.

The method for sensing a ground fault in a load control system of the present invention generally includes a motor coupled to at least three conductors with a current transformer integral therewith to measure current therein and a ground fault relay for controlling the energization of the motor, wherein the method generally comprises energizing a resistance fault relay to initiate a resistance measurement circuit while maintaining an open circuit to the motor, measuring the resistance between a winding circuit in the motor and to ground, comparing the measured resistance to a predetermined value set in the ground fault relay, maintaining the open circuit condition to the motor until the relay compares the measured resistance to the predetermined value generating a signal to close the circuit to the motor in response to data indicating the measured resistance is lower than the predetermined set value, closing the circuit to the motor to thereby energize the motor, changing a mode switch from a resistance measuring mode to a current measuring mode of the motor, measuring the load leakage current to ground, comparing the measured load leakage current to ground to a predetermined value set in the ground fault relay and generating a signal to open the circuit to the motor in response to data indicating the measured load leakage current is higher than the set predetermined value.

In a system such a presented herein, a stable power supply is obviously needed and, consequently, a universal switched mode power supply 900 is utilized which makes the relay immune to input line voltage amplitude and frequency fluctuations.

Therefore, the foregoing is considered as illustrative only of the principles of the invention. Further, various modifications may be made of the invention without departing from the scope thereof and it is desired, therefore, that only such limitations shall be placed thereon as are imposed by the prior art.

What is claimed is:

1. A method for sensing a ground fault in a load control system, including a motor coupled to at least three conductors with a current transformer integral therewith to measure current therein and a ground fault relay for controlling the energization of the motor, the method comprising the steps of:

energizing a resistance fault relay to initiate a resistance measurement circuit while maintaining an open circuit to the motor;

measuring the resistance between a winding circuit in the motor and to ground;

comparing the measured resistance to a predetermined value set in the ground fault relay;

maintaining the open circuit condition to the motor until the relay compares the measured resistance to the predetermined value;

generating a signal to close the circuit to the motor in response to data indicating the measured resistance is lower than the predetermined set value;

closing the circuit to the motor to thereby energize the motor;

changing a mode switch from a resistance measuring mode to a current measuring mode of the motor;

measuring the load leakage current to ground;

comparing the measured load leakage current to ground to a predetermined value set in the ground fault relay; and generating a signal to open the circuit to the motor in response to data indicating the measured load leakage current is higher than the set predetermined value.

2. The method of claim 1, further comprising the steps of:

injecting a current into the motor conductor to ground circuit, producing an analog voltage drop signal which is proportional to the resistance between the conductor and ground, providing a differential amplifier, amplifying the voltage drop signal, changing the voltage drop signal from an analog signal to a digital signal, and comparing the digital signal to the predetermined value set in the ground fault relay, thereby measuring the effective resistance between the motor conductor to ground.

3. The method of claim 2, further comprising the step of:

providing a plurality of gain settings in the differential amplifier for amplifying the voltage drop signal prior to the motor being energized.

4. The method of claim 2, further comprising the step of:

providing a plurality of gain settings in a resistance measuring circuit for varying the current injected into the motor conductor prior to energizing the motor.

5. The method of claim 1, further comprising the steps of:

generating a pulsating regulated current, injecting the pulsating regulated current into the auxiliary winding of the current transformer, producing a periodical test signal, and detecting the periodical test signal to verify the integrity of the current transformer and the connections of the current transformer to the ground fault relay.

6. The method of claim 5, further comprising the steps of:

providing a control processing circuit to detect the periodical test signal while the motor is energized, and activating an error condition to deactivate the motor indicating the current transformer to be defective.

7. An apparatus for sensing ground faults in a motor control system comprising:

means for energizing a resistance fault relay to initiate a resistance measurement circuit, means for measuring the resistance between a winding circuit in the motor and to ground, means to compare the measured resistance to a predetermined value set in the control system, means to generate a signal to close the circuit to the motor in response to the measured resistance, contact means to close the circuit to the motor to energize the motor, means to change a mode switch from a fault resistance measuring mode to a fault current measuring mode, means to measure the load leakage current to ground, means to compare the measured load leakage current to ground to a predetermined value, and means to generate a signal to open the circuit to the motor in response to data indicating the measured load leakage current is higher than the set predetermined value.

8. The apparatus as claimed in claim 7 further comprising:

means for producing an analog voltage drop signal between the conductor and ground, a differential amplifier means to amplify the voltage drop signal, a converter means to convert the analog voltage drop signal from the amplifier means to a digital signal, and means for comparing the digital signal to the predetermined value of resistance set in the ground fault relay.

9. An apparatus as claimed in claim 8 further comprising:

means to provide a plurality of gain settings to the differential amplifier for amplifying the voltage drop signal prior to the motor being energized.

10. An apparatus as claimed in claim 9 further comprising:

means for setting a plurality of gain parameters in a resistance measuring circuit for varying the current injected into the motor conductor.

11. An apparatus as claimed in claim 10 further comprising:

means for generating a pulsating regulated current, means for injecting the pulsating regulated current into an auxiliary winding of the current transformer, and means for producing a periodical test signal to verify the integrity of the current transformer and the connections of the current transformer to the ground fault relay.

* * * * *